No. 865,529. PATENTED SEPT. 10, 1907.
E. J. RICHMOND, DEC'D.
D. M. RICHMOND, ADMINISTRATRIX.
CHECK ROW ATTACHMENT FOR CORN PLANTERS.
APPLICATION FILED APR. 22, 1907.
2 SHEETS—SHEET 1.
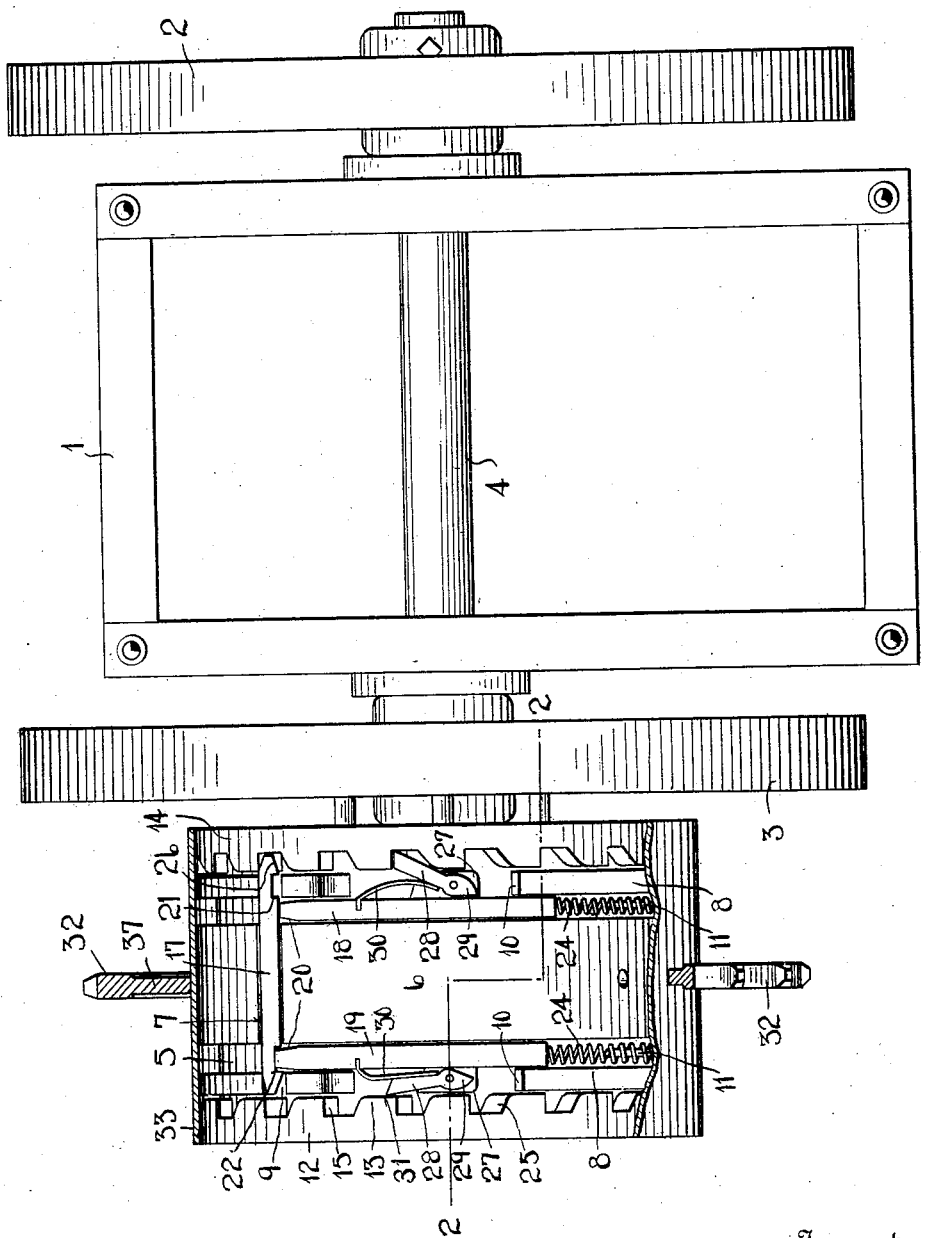

No. 865,529. PATENTED SEPT. 10, 1907.
E. J. RICHMOND, DEC'D.
D. M. RICHMOND, ADMINISTRATRIX.
CHECK ROW ATTACHMENT FOR CORN PLANTERS.
APPLICATION FILED APR. 22, 1907.
2 SHEETS—SHEET 2.
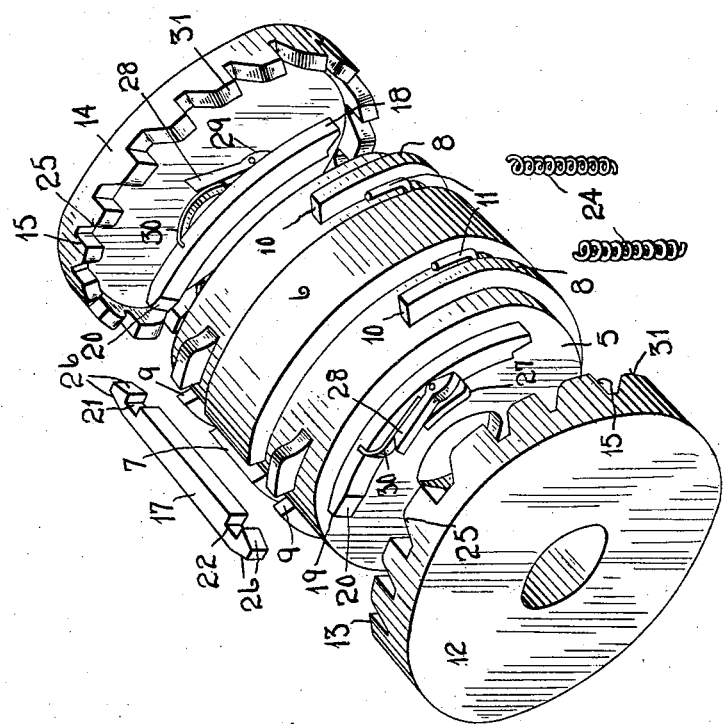
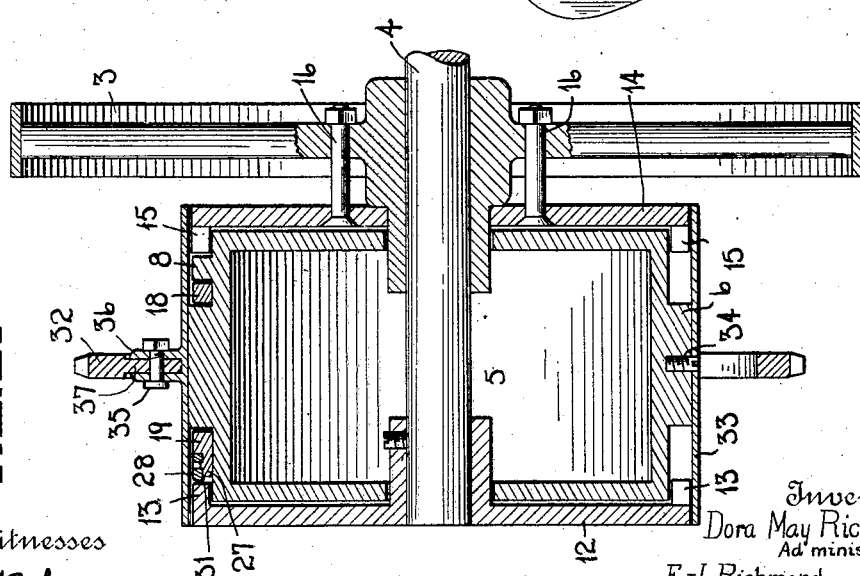

UNITED STATES PATENT OFFICE.

DORA M. RICHMOND, OF JOPLIN, MISSOURI, ADMINISTRATRIX OF EDWARD J. RICHMOND, DECEASED, ASSIGNOR OF ONE-THIRD TO JOSEPH A. HITCHENS AND ONE-THIRD TO BENJAMIN BALLENGER, BOTH OF JOPLIN, MISSOURI.

CHECK-ROW ATTACHMENT FOR CORN-PLANTERS.

No. 865,529.      Specification of Letters Patent.      Patented Sept. 10, 1907.

Application filed April 22, 1907. Serial No. 369,687.

*To all whom it may concern:*

Be it known that EDWARD J. RICHMOND, late a citizen of the United States, deceased, and a resident of Joplin, in the county of Jasper and State of Missouri, in his lifetime invented certain new and useful Improvements in Check-Row Attachments for Corn-Planters, of which the following is a specification.

This invention relates to what are known as check row attachments for corn planters, or other seeding implements, and it has for its object to provide a device of this kind which can be operated without the use of the usual check wire.

It is also adapted to provide a device in which the slowest moving wheel of the seeding implement will actuate the seeding mechanism, and also to provide a device which can be used upon the ordinary grain drill.

In the accompanying drawings, which illustrate the invention,—Figure 1 is a top plan view of a grain planter frame provided with the attachment, part of the attachment being broken away to show the interior construction; Fig. 2 is a transverse sectional view through the attachment, taken on the line 2—2 of Fig. 1; Fig. 3 is a perspective view of the different parts separated and arranged substantially in the order in which they would appear when assembled.

Referring more particularly to the drawings, 1 indicates the frame of an ordinary grain planter which may be of any suitable construction and provided with any desired form of dropping mechanism, not shown, and is supported upon wheels 2 and 3.

The axle 4 is rigidly secured to the wheel 2 at one end and projects loosely through the hub of wheel 3 and through the attachment.

The attachment comprises a drum 5 which is loosely mounted upon the shaft 4 and has its central portion provided with a wide, flat rib or projection 6 which is slotted transversely at 7. Between the edges of the rib 6 and the ends of the drum 5 are located ribs 8, each of which is provided with a notch 9, which is adapted to register with the slot 7, and also has a portion broken away, as shown at 10. Rigidly secured to the drum between each of the ribs 8 and the rib 6 is a pin 11 which is adapted to extend a short distance circumferentially around the drum, and at a short distance therefrom below the cut-away portion 10.

Rigidly secured to the outer end of the axle 4 is a wheel or disk 12, which has its periphery flanged inward and provided with teeth or projections 13 which are adapted to extend over the end of the drum and normally stand adjacent to the side of the outer rib 8. Loosely mounted upon the shaft 4, or upon the hub of the wheel 3, is a similar disk 14 having the shoulders 15 of its flange normally standing adjacent to the outer edge of the inner rib 8. The disk 14 is rigidly secured to the wheel 3 so as to be rotated therewith in any suitable manner, as by means of bolts 16.

A bar 17 is reciprocally mounted in the recesses 7 and 9 of such a length that when one end is in one of the recesses of the flange of one of the ratchet wheels 12 or 14, its other end will permit the other ratchet wheel to run free. The bar is adapted to be held in one position or the other by means of two locking bars 18 and 19, each of which it curved to correspond with the curvature of the drum 5 and is of such a width as to fit between the rib 8 and the rib 6. The forward ends of the locking bars are preferably tapered or inclined, as shown at 20, and are adapted to be moved into and out of two notches 21 and 22 upon what will be termed the rear side of the bar 17. The rear end of each of the locking bars is recessed so as to form a lip or overhanging portion beneath which one end of a spring 24 is adapted to be inclosed, the other end of said spring fitting over the pin or hook 11. In this manner the two locking bars are normally forced forward so as to cause their inclined ends 20 to enter the notches 21 or 22 as soon as either one of said notches is brought into register with the space between the ribs 8 and 6. A reciprocatory movement is given to the bar 17 by means of the rear shoulders 25 of the ratchet wheels, which are preferably rounded and which engage with the inclined ends 26 of said bar and thereby force the bar in one direction or the other according to whichever one of the ratchet wheels is being actuated faster than the other by its driving wheel. In Fig. 1 of the drawings, the bar 17 is shown with one end resting between the shoulders 15 and 25 of the ratchet wheel 14 which indicates that the drive wheel 3 of the machine is the one that is actuating the dropping mechanism, or, in other words, the position which the part would take if the machine were being turned with the wheel 2 traveling around with the wheel 3 as a pivot or center. If the machine should be turned in the opposite direction so as to cause the wheel 3 to travel around in a circle or any portion thereof, with the wheel 2 as a center, the shoulder 25 would engage with the inclined surface 26 of the end of the bar 17 that was in engagement with the ratchets of wheels 14 and force the bar lengthwise out of engagement with said ratchet wheel and cause its other end to project into the recess between the shoulders 13 and 25 of the ratchet wheel 12, thereby permitting the ratchet wheel 14 to run free and to cause the ratchet wheel 12 to be in position for actuating the dropping mechanism.

The outer face of each of the locking bars is provided with a lip or flange 27 upon which is pivotally mounted a dog 28 that is adapted to be located within the smooth portion of the drum 5 or the cut-away portion 10 of the ribs 8, with its free end adapted to be engaged by the shoulders or teeth of the ratchet wheels 12 and 14. The rear end of each dog is provided with a heel or shoulder 29, which is adapted to be held against the outer face of the locking bar by means of a spring 30, which is adapted to engage with the forward end of the dog and normally hold it outward in position for engaging with said ratchet wheels. In this manner, when there is a sufficient variation of the rates of speed or travel of the wheels as to cause a shifting of the bar 17 the wheel that was the slower moving one and is in engagement with the bar 17 will cause the drum 5 to carry the shifting bar, as 19, at the opposite end and the pawl 28 thereon, forward faster than the slower wheel is moving until the free end of the pawl engages with one of the shoulders 15 and has its further forward movement stopped, which will also cause the locking bar, to which it is pivoted, to stop its forward movement with the drum. This will cause the forward end of the bar to be withdrawn from the notch 22 and thereby unlock the bar 17 and permit it to be moved longitudinally by the rounded shoulder 25 of the faster moving wheel 14 into engagement at its other end with the shoulders of the slower moving wheel 12. When the speed of the wheels vary again the same process takes place with the pawl on the bar 18 and the bar 17 is unlocked and shifted in the opposite direction. This renders the action of the device absolutely automatic and requires no attention from the attendant.

Motion from the drum 5 which is transmitted to it by the mechanism as above described, is transmitted to the dropping mechanism of the machine in any desired manner, preferably by means of a sprocket chain, not shown, and a sprocket wheel 32, which is mounted upon a shell 33 that surrounds the drum 5 and ratchet wheels 12 and 14. The shell is secured to the drum in any desired manner, preferably by means of a screw 34, and the sprocket wheel is secured to the drum, preferably by means of bolts 35 which pass through ears 36 on the shell and through spokes or inwardly extending projections 37 of the ratchet wheel.

By equipping a corn dropper with the above simple mechanism, it is evident that the usual check wire can be dispensed with by constructing the wheels of the proper diameter, or by properly proportioning the sprocket wheel on the dropping mechanism in relation to the diameter of the sprocket wheel 32. This will save the trouble of having to change the wire at each side of the field for each trip of the corn planter, and it will also permit of the machine being readily turned at the end of each row without the possibility of the mechanism being actuated to drop any corn.

Instead of utilizing the attachment for check row planting, it can be used as well for continuous dropping, as from a seed drill, in which case the attachment would be placed between the wheel 3 and the drill box and the axle 4 would be extended through to the other end of the drill box and the wheel 2 rigidly connected thereto. When arranged in this manner it is evident that the drill can be turned at each end with one of the wheels standing stationary, as above described, and the other one moving in a half circle without the drill mechanism being actuated, no difference whether the drill is turned to the right or to the left. This avoids the necessity for the person in charge of the drill actuating any special mechanism for throwing the drill into and out of gear when making the turn at either end.

Although the most desirable form for constructing the parts of the attachment have been shown and described, it is evident that such changes in the construction, form, and size of the parts, as come within the scope of the appended claims may be made without departing from the spirit of the invention.

Having described the invention, I claim:—

1. In an attachment for seeding machines, a transmitting element, two oppositely located shouldered elements, a reciprocatory bar adapted to be automatically moved into and out of engagement with either of said two elements, and means for locking said bar at the limit of its movement in either direction.

2. In an attachment for seeding machines, a recessed drum, a shouldered wheel at each end thereof, a bar reciprocally mounted in said recess and adapted to be automatically moved into engagement with either of said wheels, means for locking said bar in said engagement, and a transmitting element secured to the drum.

3. In an attachment for seeding machines, a drum provided with transversely recessed ribs, a shouldered wheel at each end of said drum, a recessed bar reciprocally mounted in said recesses and adapted to be automatically moved into engagement with either of said wheels, reciprocatory locking bars mounted between said ribs for engaging with the recessed portions of the reciprocatory bar and locking it in said engagement, and a transmitting element secured to the drum.

4. In an attachment for seeding machines, a drum provided with transversely recessed ribs, a shouldered wheel at each end of the drum, a recessed bar reciprocally mounted in said transverse recesses, reciprocatory locking bars between said ribs for engaging with the recessed portions of the reciprocatory bar, a spring-pressed dog on each locking bar adapted to engage with the shoulders of said wheels, and a transmiting element secured to the drum.

5. In an attachment for seeding machines, a drum provided with transversely recessed ribs, a shouldered wheel at each end of the drum, a recessed bar reciprocally mounted in said transverse recesses, spring-pressed reciprocatory locking bars between said ribs, each of which is provided with a projection, a dog pivotally secured on each projection, a spring adapted to hold one end of said dog in engagement with its bar, and the other end in engagement with said shoulders, and a transmitting element secured to the drum.

6. In an attachment for seeding machines, a drum provided with transversely recessed ribs, a shouldered wheel at each end of the drum, a recessed bar in said transverse recesses adapted to engage with either of said wheels, reciprocatory locking bars between said ribs in position for engaging with the recessed portions of the reciprocatory bar, a dog pivotally secured to each locking bar in position for engaging with the shoulders of one of said wheels, a bent pin to the rear of each locking bar, a coiled spring upon each of said pins with its free end in engagement with the rear end of said locking bar, and a transmitting element secured to the drum.

7. In an attachment for seeding machines, a drum provided with transversely recessed ribs, a shouldered wheel at each end of the drum, a recessed bar reciprocally mounted in said transverse recesses, the ends of which are inclined and adapted to be engaged by said shoulders, spring-pressed locking bars reciprocally mounted between said ribs in position for engaging with the recessed portions of the reciprocatory bar, the engaging ends of said locking bars being inclined, and a transmitting element secured to the drum.

8. In an attachment for seeding machines, a drum provided with transversely recessed ribs, an inwardly flanged recessed wheel at each end of the drum, said flanges extending over the ends of the drum and one shoulder of each of the recesses being rounded, a recessed locking bar reciprocally mounted in said transverse recesses, the ends of which are inclined and adapted to be engaged by said rounded shoulders, spring-pressed locking bars reciprocally mounted between said ribs in position for engaging with the recessed portions of the reciprocatory bar, the forward ends of said locking bars being inclined, and a transmitting element secured to said drum.

9. In an attachment for seeding machines, a drum, a ratchet wheel at each end thereof, a bar reciprocally mounted on the drum in position for being automatically forced into engagement with either of said wheels, means for locking said bar in said position, a shell around said drum and adapted to be rigidly secured thereto, and a sprocket wheel secured to the central portion of said shell.

In testimony whereof I have hereunto set my hand in the presence of two subscribing witnesses.

DORA M. RICHMOND,
*Administratrix of the estate of Edward J. Richmond, deceased.*

Witnesses:
H. M. RAMSEY,
H. M. RAMSEY, Jr.